United States Patent [19]
Cann

[11] 3,879,954
[45] Apr. 29, 1975

[54] METHOD OF CHILLING PRODUCTS
[75] Inventor: Lyle L. Cann, Peotone, Ill.
[73] Assignee: Chemetron Corporation, Chicago, Ill.
[22] Filed: June 3, 1974
[21] Appl. No.: 475,410

Related U.S. Application Data
[62] Division of Ser. No. 331,124, Feb. 9, 1973, Pat. No. 3,841,109.

[52] U.S. Cl............. 62/63; 62/413; 34/212; 34/223
[51] Int. Cl............................. F25d 13/06
[58] Field of Search ............ 62/63, 266, 380, 413; 34/210, 212, 213, 218, 219, 223

[56] References Cited
UNITED STATES PATENTS
3,226,947  1/1966  Wakatsuki et al............. 62/380 X
3,267,585  8/1966  Futer ........................ 62/63

Primary Examiner—Meyer Perlin
Assistant Examiner—Ronald C. Capossela
Attorney, Agent, or Firm—N. M. Esser

[57] ABSTRACT

An apparatus and method for chilling or freezing with a cold gas is provided. Internal contours conduct the cold gases effectively against the product to be frozen. Movable sections having molded reinforced plastic surfaces strengthened by enclosed tubular supports provide effective isolation of the freezing chamber while enabling substantially complete access to the interior of the tunnel for cleaning and maintenance.

4 Claims, 11 Drawing Figures

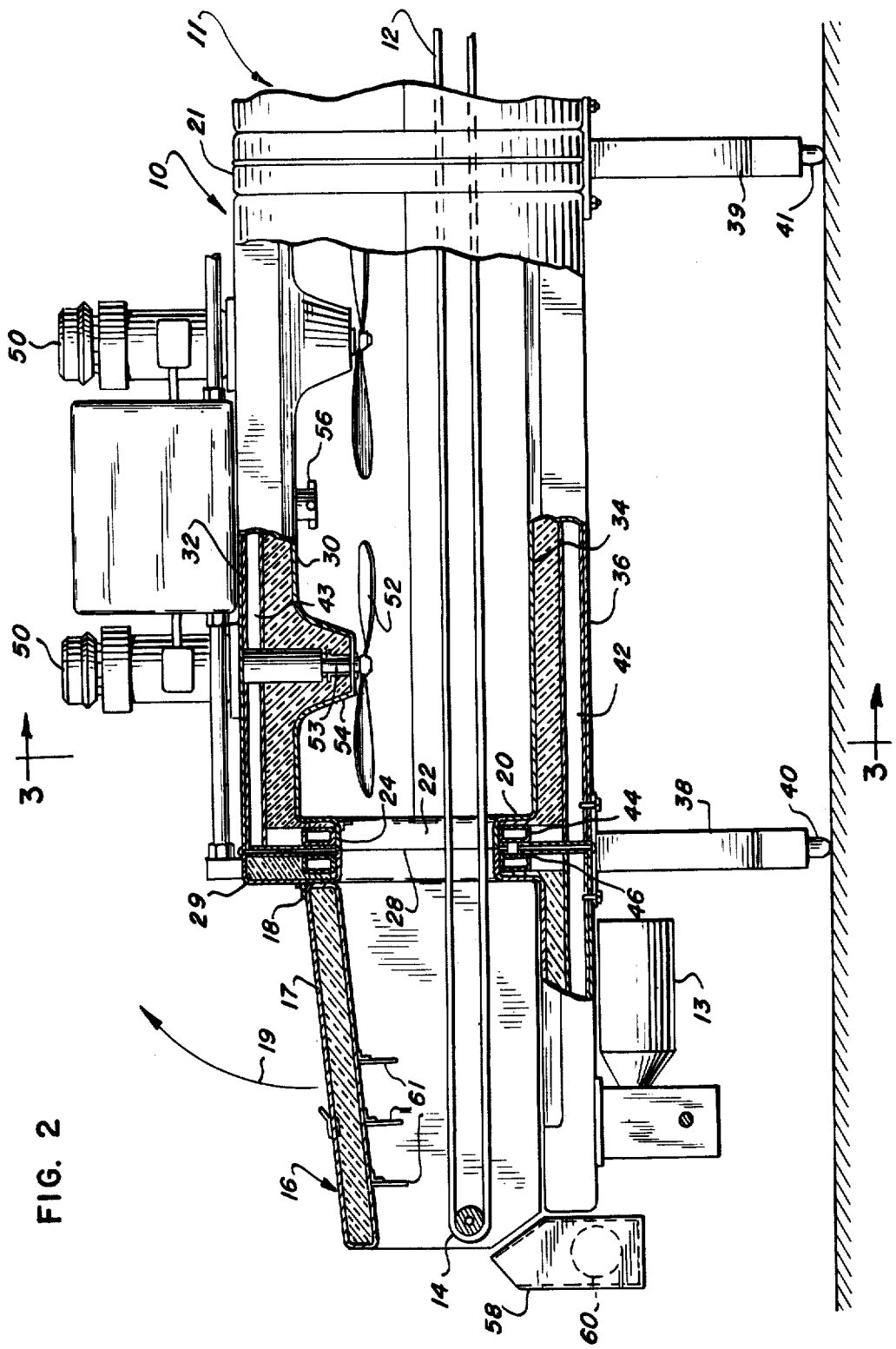

METHOD OF CHILLING PRODUCTS

This is a division of application Ser. No. 331,124, filed Feb. 9, 1973, now U.S. Pat. No. 3,841,109.

BACKGROUND OF THE INVENTION

Fast freezing of various products, particularly foods, is becoming increasingly important. When freezing is accomplished at temperatures achieved with liquid nitrogen, about −195°C., or at dry ice sublimation temperatures, about −78.5°C., the water content of the product forms extremely small ice crystals, thus preserving the texture of the food. Moreover, the surface is quickly sealed so that there is little water loss and small shrinkage. In one method of accomplishing such freezing, the food product is placed on an endless bolt and conveyed through a "tunnel" in which the food is exposed to the cryogenic gases. Freezing is accomplished in a matter of minutes.

To operate economically at the very low temperatures used to achieve the desired results, it is necessary to employ apparatus of a particularly effective design.

THE INVENTION

This invention comprises a tunnel for reducing the temperature of products, for example food, on a conveyor belt and a method for its operation. It is an object of this invention to provide a structure for the economical and convenient application of cooling gases to substances to be chilled or frozen. It is a further object of this invention to provide the method and apparatus for the efficient application of cryogenic refrigerants within a longitudinal housing. It is a further object to provide a freezer element which can be supplemented in increments to accomodate conveyors of various lengths. A still further object is to provide a freezer tunnel having interior contours to facilitate efficient application of cryogen to the materials being chilled. A further object is to provide a construction featuring low loss of cooling to the surroundings outside the tunnel walls. A still further object is to provide a tunnel in which the interior is readily accessible for cleaning and maintenance. It is a further object to provide a tunnel of relatively large interior dimensions but small exterior dimensions.

These and other objects will become apparent from reference to the following descriptive specification and drawings wherein a preferred embodiment is shown by way of illustration only, and wherein:

FIG. 2 is an elevational view, partly in section and partly broken away of a freezer showing features of the apparatus, especially a module constructed in accordance with this invention.

Figure 1:
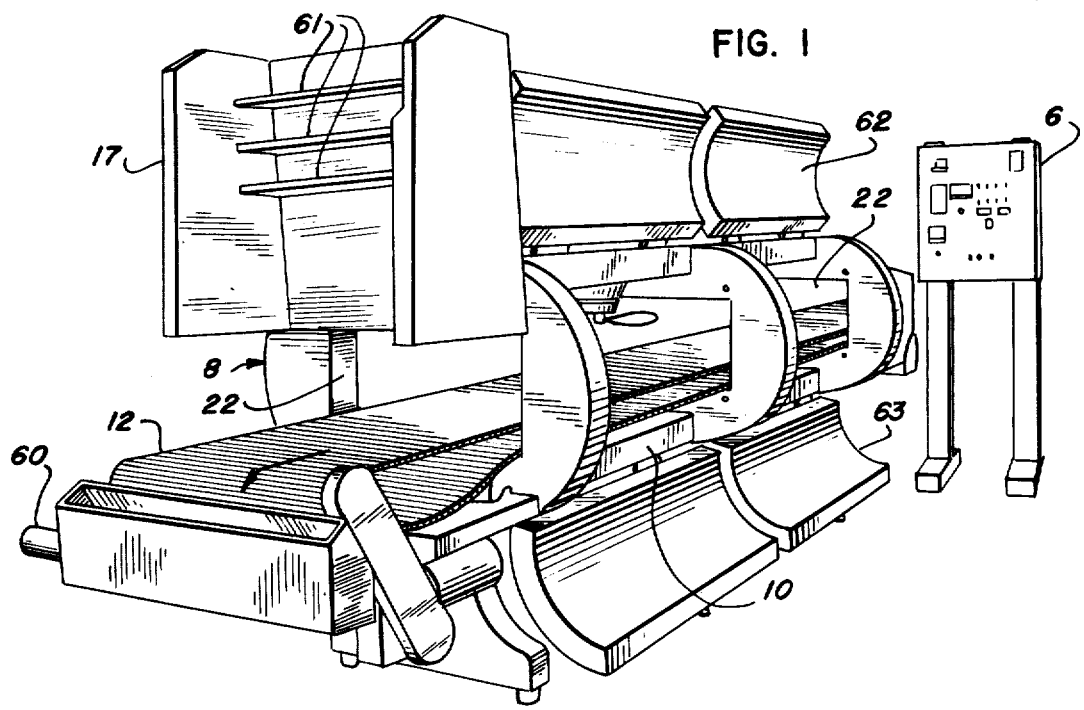
FIG. 1 is a projected view of the cryogenic freezer and its control panel.

The general arrangement of the elements of this invention is illustrated in FIG. 1. Although, for the purposes of this illustration, the invention will be described with reference to the application of cryogenic refrigerants, it is to be understood that a stream of cold gas developed by a passage of the gas over heat exchange coils chilled by conventional mechanical or absorption refrigeration means may likewise be employed to chill the product.

According to this invention there is provided a chilling and freezing apparatus comprising a longitudinal housing 8 having passages 22 through its ends to enclose a conveyor 12 and means to provide a cold gas or cryogen. The housing includes at least one freezer module, the interior of said module having concave side walls extending above and below the conveyor, a top, preferably convex, panel between said side walls and means to circulate the cold gas within said housing. The means to circulate the gas may comprise a plurality of fans disposed in spaced relation along the length of the housing and means to adjust the velocity of the cold gas from one fan relative to the velocity of gas from an adjacent fan, for example, by varying the rotational speed of the fan. In one embodiment the concave side wall is hinged to form a door and preferably the concave side wall comprises a pair of doors 62 and 63 on longitudinally extending hinges arranged to move in opposite directions upon opening.

The housing encloses a chamber defined by said side walls and opposed end walls having conveyor passages therethrough, each passage being defined by a rim extending away from said chamber. A top panel having an upturned lip joins the upper portions of said walls, and a channel having downturned edge joins the bottoms of said walls.

In one embodiment the members defining said chamber are fiber reinforced resin shells molded to present no seams to the interior of the housing where they would be exposed to the very cold environment. They are strengthened by internal steel supports and are filled with cellular insulation.

The freezing apparatus may include a vestibule about an end of the conveyor, the vestibule comprising a lid which is movable to uncover said conveyor and an exhaust duct 60 beneath the end of said conveyor to collect spend cryogen. Suitable conveyor widths are 30 and 60 inches but other widths may be employed.

As shown in FIG. 1, the doors 62 and 63 and the vestibule lid 17 are in the open position to provide nearly complete access to the conveyor as it passes through the freezer housing. Controls on the modules to provide the cryogen and to regulate the freezing conditions may be operated remotely from a stand 6 as illustrated.

According to this invention the temperature of a product is reduced at high efficiency by a process comprising the steps of passing the product on a conveyor longitudinally through a housing from the housing inlet to the housing outlet, directing cold gas in the form of a stream at the product, and guiding the stream along a curved path vertically within said housing. In a preferred embodiment, the cold gas is directed in a plurality of streams against the product and the velocity of the streams is increased sequentially from near the inlet to near the outlet of the housing. The velocity of the stream near the inlet is desirably more than about 500 feet per minute; the velocity of the stream near the outlet of the housing may be about 2,500 feet per minute.

For at least a portion of its course between the fans and the product the current or stream of cold gas is guided along a curved path. In one embodiment, cryogen is directed down onto the product and a portion of the current of cryogen is returned to the fan which includes the step of guiding the current with an arcuate surface from the lower portion of said housing to the upper portion. In a preferred embodiment guiding is effected over more than about 90° of arc and desirably over about 180° of arc along an arcuate surface which defines a segment of a right circular cylinder. For some applications it may be desirable to direct the current of cryogen along the arcuate surface and then to the product on the conveyor.

For increased efficiency in cooling, high gas velocities, for example, on the order of about 2,500 feet per minute or more may be employed. Some products in their initial movement through the freezer will not withstand a gas of such velocity until after they are crusted or chilled sufficiently to take a set. In such instances, the fans near the inlet to the freezer may operate to develop a current of lower velocity, those near the middle of the freezer develop a higher velocity and those near the outlet of the freezer generate a still more rapidly moving stream of cryogen.

The invention may be better understood by reference to FIG. 2 of the drawings. There are shown a freezer having longitudinally extending housing including a module 10 through which passes a stainless steel conveyor 12, the belt of which is fabricated of open links to accommodate the passage of cryogen. The conveyor is driven by a conventional means 13. At a terminus 14 of the conveyor there is a vestibule 16 through which the materials to be frozen leave the freezer. A number of modules 10 may be secured in end to end relation and, optionally, fitted with vestibules to provide a freezer of the desired length and configuration. A second module 11 shown secured to the module 10 illustrates this aspect of the invention.

The vestibule 16 comprises a lid 17 mounted on a hinge 18 so that it may be lifted clear of the conveyor in the direction shown by the arrow 19.

The freezer module 10 of this invention comprises a chamber defined by end wall 20 having a passage 22 therethrough bounded by a rim 24 and finished by a closure 28. A second wall 21 is at the opposite end of the module. A similar wall 29 forms the end of the vestibule 16. Joining the upper portions of walls 20 and 21 are a top panel 30 and a top cover 32. The lower parts of the walls are joined by a channel 34 and a bottom cover 36. Preferably the panel 30 and the channel 34 each have convex surfaces facing the conveyor. The freezer module is supported at its ends by pedestals 38 and 39 having threaded, adjustable feet 40 and 41.

In a preferred embodiment, the interior and exterior surfaces of the module are molded from fiberglass reinforced polyester or epoxy resin to a thickness of about 0.075 to about 0.090 inches. This thickness, together with the molded contours of the various panels, is sufficient to provide rigidity; restricting the thickness to this dimension limits the thermal gradients so that the panels will not craze or surface crack during the cooling down period when the freezer encounters very large and rapid temperature changes, it being the usual practice to reduce the temperature from ambient to working temperature in a matter of minutes.

A steel frame within the molded structure provides rigidity and additional support for heavy accessory items. The steel frame comprises lower and upper longitudinal members 42 and 43, respectively, fabricated from square cross-section stainless steel tubes, stainless being selected because of its low thermal conductivity. The end walls 20 and 21 and vestibule wall 29 are reinforced with a loop of structural steel tubing 44. Structural steel is used for this application because the loop is remote from the exterior shells of the freezer and so can contribute but little to the loss of cooling from the tunnel. Pads 46 on the loop 44 extend through the closure 28 so that metal to metal contact can be made to assure a rigid assembly of the modules to each other, to the vestibule and other freezer parts.

Arranged on the upper tube members 43 are motors 50, driving fans 52 which direct the cryogen introduced via nozzles 56 over and around product on the conveyor 12. The shafts 53 for the fans are enclosed in truncated conical shrouds 54 secured to the panel 30. The spent cryogen is collected by an intake 58 located beneath the vestibule 16 adjacent the conveyor terminus 14 and is discharged through duct 60. One or more curtains 61 are provided to modulate the flow of the discharging cryogen.

Figure 3:
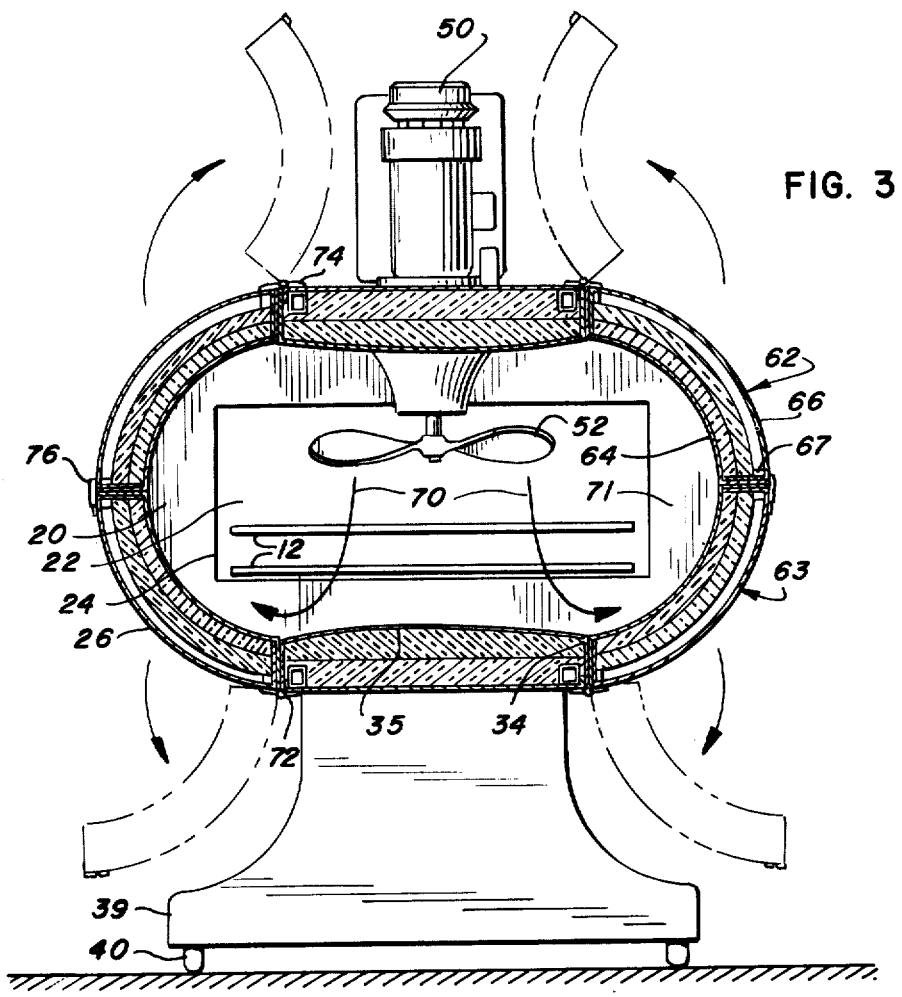
FIG. 3 illustrates a cross-section of the apparatus of FIG. 2 taken on the section line 3—3 and shows features of the module and the doors which may form its sides.

Other features of the freezer construction are shown in FIG. 3 which presents a cross-section of the module 10. The passage 22 in the end wall 20 is bounded by the rim 24 and the flange 26. The sides of the freezer module are arcuate in shape and direct the flow of cryogen beneath and around the material to be frozen.

In a preferred embodiment the walls are formed by upper and lower doors 62 and 63, respectively, in which the inner walls define the surface of a right circular cylinder. When closed they lie on a radius having its center approximately in a plane in which the product being chilled or frozen moves while supported on the conveyor.

The curvature of the inner walls extends over more than about 90° of arc and, preferably, extends for about 180°. These curved segments are arranged to provide a clearance 71 beyond the edge of the conveyor 12 to facilitate the return current of the cryogen for circulation by the fan 52.

Figure 5:
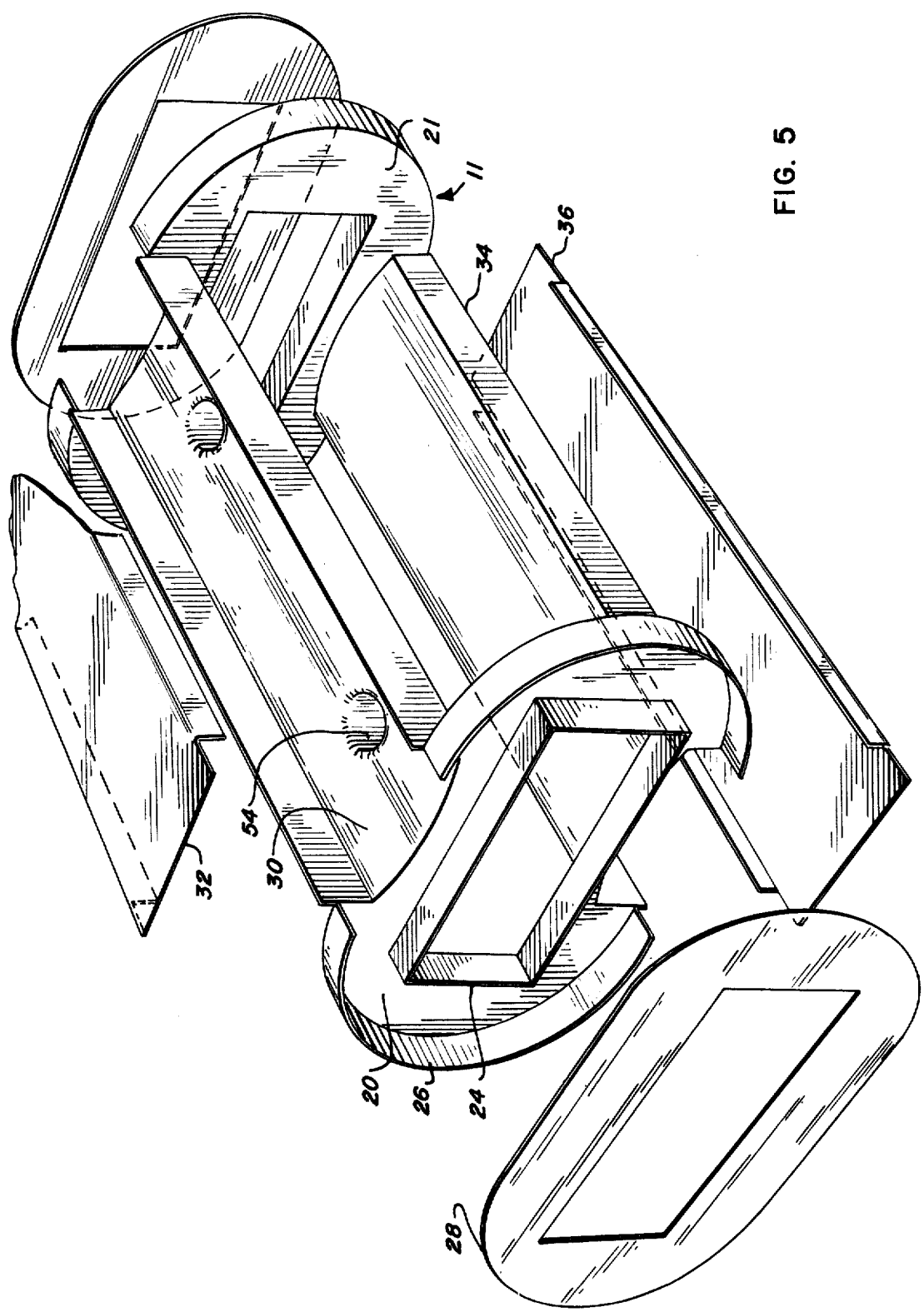
FIG. 5 is an exploded view further illustrating the surface members of the module of FIG. 4.
Figure 6:
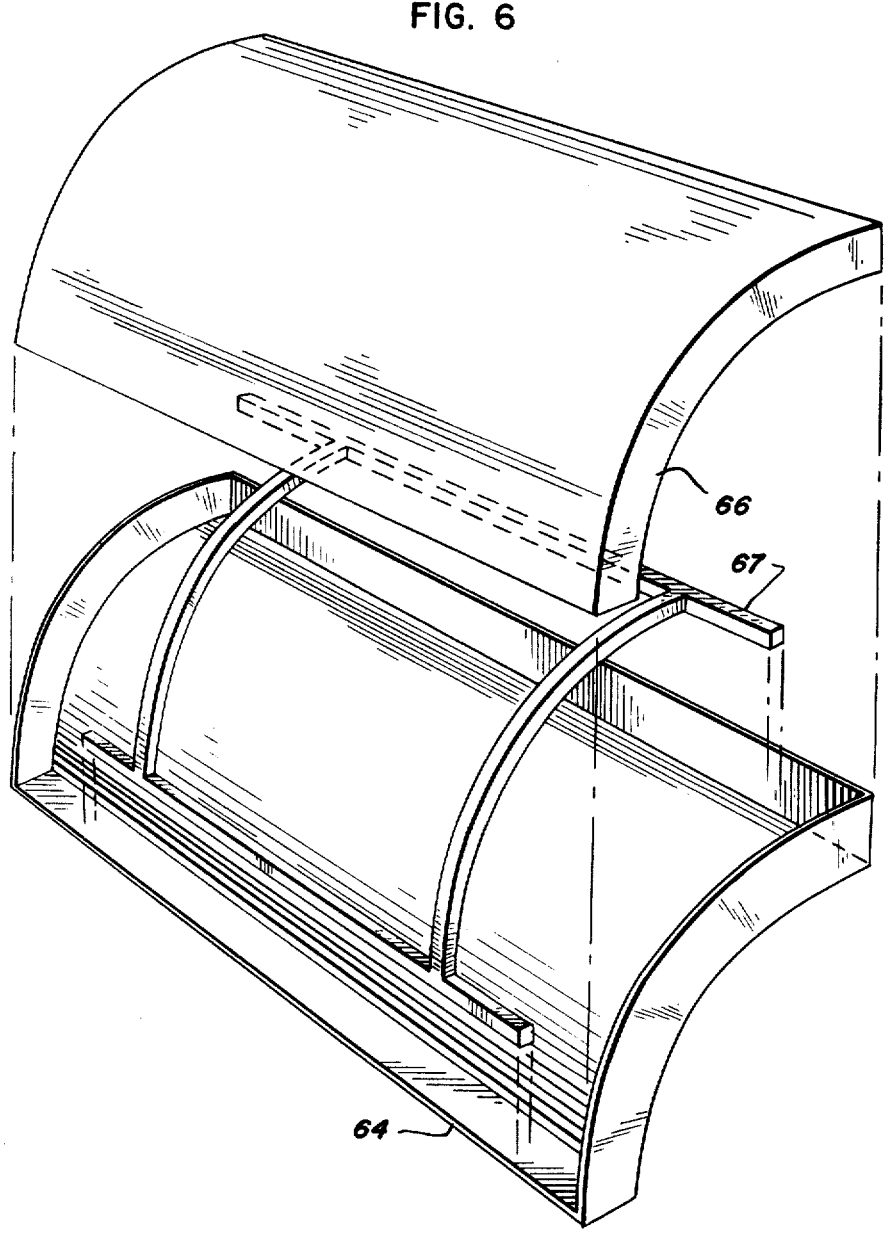
FIG. 6 is an exploded view showing the structure of the doors of FIG. 3.

Each door comprises an inner housing 64 and an outer pan 66 over a support 67 of steel tubes. The arrangement of door elements is shown in FIG. 5. The arch 35 of the channel 34 provides additional rigidity to this member and helps define a smooth circulation path for the cryogen gas within the tunnel. Motors 50 drive fans 52 which impel the cryogen to follow a path illustrated by the arrows 70.

In one embodiment, the conveyor has a width of 30 inches and passes through a module having a width of 55 inches. The fans are 28 ½ inches in diameter and are driven at speeds of from about 200 rpm to about 1,750 rpm, the rotational speed of each being individually selected to provide the degree of cryogen circulation desired. A linear velocity of about 2,000 feet per minute produced good results. For those products which are initially too delicate for exposure to high velocity currents of cryogen, the fans near the entrance are operated at a low rpm. The speed of the fans toward the discharge end of the tunnel are operated at higher speeds as the character of the product on the conveyor permits. As products are being chilled, the reduction in their temperature generally increases the viscosity and cohesiveness of the products; often the chilling is accompanied by the formation of a surface crust of small ice crystals which increases the rigidity of the product.

In a preferred embodiment the doors are suspended from the channel and panel by longitudinal hinges 72 and 74 and fastened in the closed position by latch 76. The hinges have internal spring counterbalances to facilitate opening and closing the doors.

Figure 4:
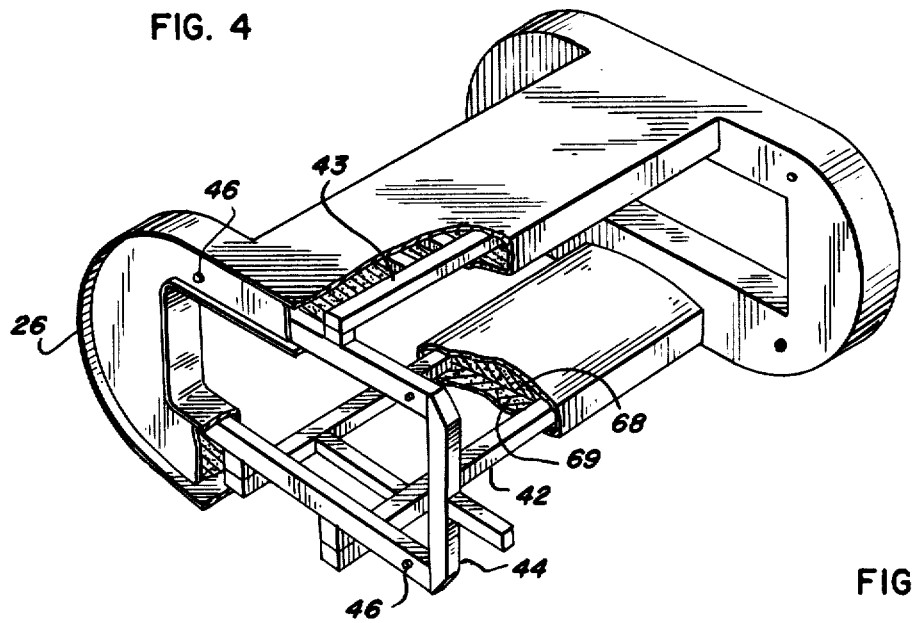
FIG. 4 is a projected view, with surface members partly broken away to show the interior features of a module of the apparatus of FIG. 2.

The projected view shown in FIG. 4 illustrates the arrangement of the tubular steel structure enclosed within the molded reinforced resin skins. Also illustrated in this view is the cellular urethane insulation which is manufactured by a "free-rise" procedure and then cemented in place in two layers 68 and 69. The use of two layers each about 2 or 2 ½ inches thick distributes the thermal stress so that there is less tendency for the total insulation mass to crack and further provides for at least one structurally sound insulation member should a crack develop in a single layer.

In a preferred embodiment the reinforced resin shells are molded as illustrated in FIG. 5 so that no seams are exposed to the extremely low temperatures within the tunnel. The module body 11 is substantially symmetrical and has the wall 20 along with the rim 24 and the flange 26, and duplicate wall 21, molded integrally with the panel 30 and channel 34. After the interior steel supports have been emplaced and the urethane foam cemented in position, a closure 28 is cemented to the rim and flange at each end to close the module end. Top cover 32 and bottom cover 36 are cemented to form box members with the panel 30 and channel 34 respectively.

Figure 7A:
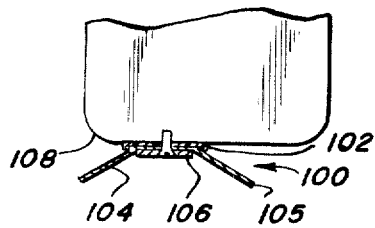
FIGS. 7A and 7B show details of the gasket construction employed on the module of FIG. 2.
Figure 7B:
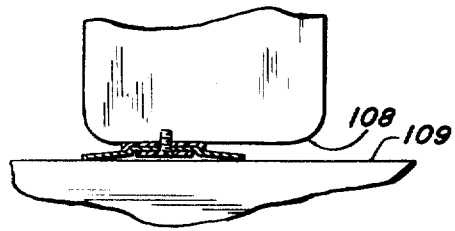

Because of the extremely large temperature differences which regularly exist between the gas in the interior of the tunnel and the ambient atmosphere, efficient operations require that an effective seal be maintained to isolate the cryogen from the workroom environment. This, of course, could be accomplished by minimizing the number and size of the openings but, with such an enclosed structure, maintenance of the freezer in a clean and sanitary condition would become most difficult. The extensive openings employed to furnish generous access to the interior of the freezing tunnel of this invention are effectively sealed by the gasket construction illustrated in FIGS. 7A and 7B. The gasket assembly 100 includes a backing strip 102, a sealing element 104 and a securing member 106 shown as employed to seal the vestibule 16 to the wall 29. The backing strip 102 is of polyethylene and securing member 106 is a strip of stainless steel; the sealing element 104 is formed from a sheet of polyester film 0.014 inches thick. When assembled as shown in FIG. 7A, the seal 104 is forced to assume an angle so that the ends 105 extend away from the vestibule skin 108 and substantially beyond the surface of the securing member. When the gasket is urged into sealing relation with an abutting member such as the vestibule wall 109, the seal deflects as shown in FIG. 7B.

Figure 8A:
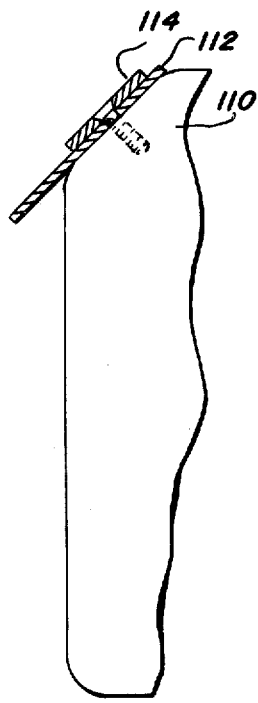
FIGS. 8A and 8B illustrate another embodiment of the gasket.
Figure 8B:
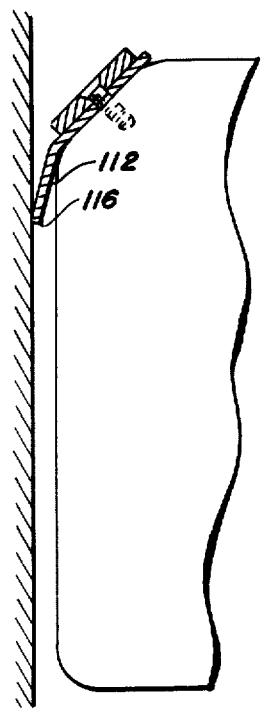

An alternate embodiment of the gasket for use on an angled surface is illustrated in FIGS. 8A and 8B. In this illustration the supporting member 110 is a door pan and the polyester sheet seal 112 is held in place with securing strip 114. FIG. 8B illustrates the position of the seal when edge 116 is defected into sealing engagement with an abutting surface indicated by the dotted line.

Figure 9:
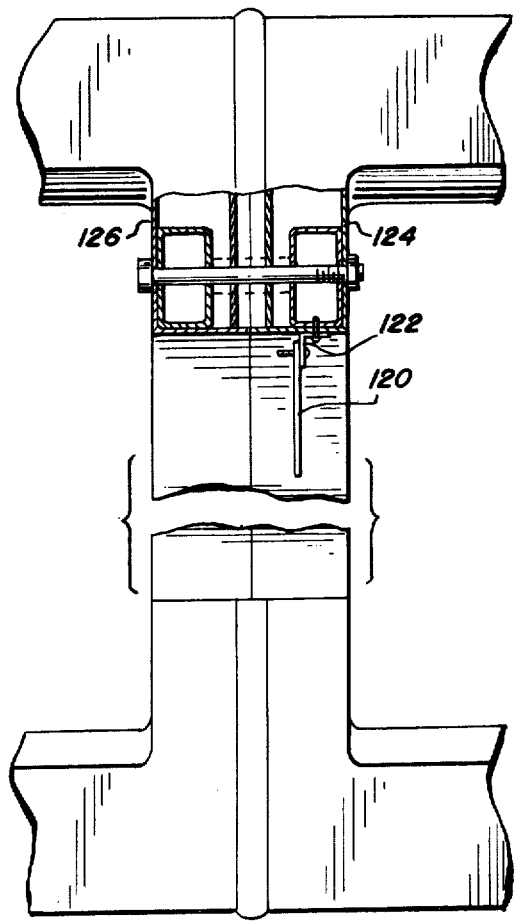
FIG. 9 illustrates a baffle for directing and controlling flow of the cryogen generally parallel to the longitudinal axis of the freezer.

In operating the freezer it is desirable that the flow of cryogen through the tunnel be counter current to the movement of the product being frozen. Thus, a major portion of the cryogen is injected into the tunnel at the end from which the frozen product is withdrawn and most of the cryogen leaves the tunnel around the warm product entrance although a small quantity, sufficient to prevent ingress of ambient air, is discharged along with the frozen product. While the fans 52 are circulating the cryogen as illustrated by arrow 70 in FIG. 3, the gas flow counter current to the product movement is maintained by adjustable baffles arranged at the module walls. Such a baffle is shown in FIG. 9 mounted on a hinge 122 secured to module end wall 124. Also shown is a wall 126 of an adjacent module. The quantity of gas circulated longitudinally through the tunnel is readily adjusted by moving the baffle 120 on its hinge.

Without further explanation, one skilled in the art is enabled to use the invention to its fullest extent. Modifications to the illustrated embodiments are intended to be within the scope of the appended claims.

I claim:

1. The method of reducing the temperature of a product comprising the steps of passing the product on a conveyor through a housing from the housing inlet to the housing outlet, directing a cold gas in the form of a stream at the product, said stream having a velocity of at least about 500 feet per minute, dividing the stream into two currents, guiding each current along a curved path within said housing, and combining said two currents into a stream for repeated direction at the product.

2. The method of claim 1 wherein the stream of cold gas has a velocity from about 500 to about 2,500 feet per minute.

3. The method of claim 1 in which the cold gas is directed in a plurality of streams, and increasing the velocity of the streams, sequentially from near the inlet to near the outlet of the housing.

4. The method according to claim 3 wherein the velocity of the streams is increased from about 500 feet per minute near the inlet to about 2,500 feet per minute near the outlet of the housing.

* * * * *